(12) United States Patent
Mizuno et al.

(10) Patent No.: US 10,886,038 B2
(45) Date of Patent: Jan. 5, 2021

(54) EXTERIOR MEMBER-EQUIPPED WIRE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Housei Mizuno, Mie (JP); Yasuyuki Yamamoto, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 111 days.

(21) Appl. No.: 16/093,827

(22) PCT Filed: Apr. 11, 2017

(86) PCT No.: PCT/JP2017/014811
§ 371 (c)(1),
(2) Date: Oct. 15, 2018

(87) PCT Pub. No.: WO2017/183520
PCT Pub. Date: Oct. 26, 2017

(65) Prior Publication Data
US 2019/0139675 A1  May 9, 2019

(30) Foreign Application Priority Data

Apr. 18, 2016 (JP) .................................. 2016-082741
Mar. 6, 2017 (JP) .................................. 2017-041698

(51) Int. Cl.
*H01B 7/18* (2006.01)
*H02G 3/04* (2006.01)
(Continued)

(52) U.S. Cl.
CPC ............. *H01B 7/18* (2013.01); *H01B 7/0045* (2013.01); *H02G 3/0462* (2013.01);
(Continued)

(58) Field of Classification Search
CPC combination set(s) only.
See application file for complete search history.

(56) References Cited

U.S. PATENT DOCUMENTS

| 5,940,962 A * | 8/1999 | Shima ................ B60R 16/0215 174/105 R |
| 8,674,228 B2 * | 3/2014 | Dion .................... H01B 13/262 174/105 R |

(Continued)

FOREIGN PATENT DOCUMENTS

| JP | 2013-192415 | 9/2013 | |
| JP | 2013192415 A * | 9/2013 | ........... H02G 3/0418 |

(Continued)

OTHER PUBLICATIONS

Official Communication issued in International Bureau of WIPO Patent Application No. PCT/JP2017/014811, dated Jul. 11, 2017.

*Primary Examiner* — Binh B Tran
*Assistant Examiner* — Krystal Robinson
(74) *Attorney, Agent, or Firm* — Greenblum & Bernstein, P.L.C.

(57) ABSTRACT

It is an object of the present invention to provide a technology that makes it possible to easily maintain the wrapped state of a sheet member around a wire. An exterior member-equipped wire includes a wire and an exterior member. The exterior member is formed by the sheet member being (Continued)

wrapped around the wire. The sheet member includes a sheet-like body portion formed to be able to be wrapped around the wire, and an easily bendable portion constituting a portion of the sheet-like body portion that extends along a circumferential direction of the wire and whose portion extending along an extension direction of the wire is formed to be more easy to bend than other portions of the sheet-like body portion.

9 Claims, 4 Drawing Sheets

(51) Int. Cl.
  *H01B 7/00* (2006.01)
  *B60R 16/02* (2006.01)
  *H02G 3/00* (2006.01)
(52) U.S. Cl.
  CPC ........ *B60R 16/0215* (2013.01); *H02G 3/0418* (2013.01); *H02G 3/26* (2013.01)

(56) References Cited

U.S. PATENT DOCUMENTS

| | | | | |
|---|---|---|---|---|
| 9,349,509 | B2* | 5/2016 | Matsuda | H02G 3/0487 |
| 2013/0048139 | A1* | 2/2013 | Burdy | D03D 13/004 |
| | | | | 139/291 R |
| 2013/0206275 | A1* | 8/2013 | Itoh | D06O 7/02 |
| | | | | 139/35 |
| 2014/0255627 | A1* | 9/2014 | Yamaguchi | H01B 7/1805 |
| | | | | 428/34.1 |
| 2014/0256202 | A1* | 9/2014 | Laurent | D06H 5/002 |
| | | | | 442/181 |
| 2014/0262476 | A1* | 9/2014 | Laurent | D03D 1/0058 |
| | | | | 174/379 |
| 2014/0273698 | A1* | 9/2014 | Woodruff | D03D 1/0035 |
| | | | | 442/301 |
| 2014/0290978 | A1* | 10/2014 | Kihara | H01B 3/52 |
| | | | | 174/121 R |
| 2014/0305697 | A1* | 10/2014 | Hudson | H02G 1/06 |
| | | | | 174/72 A |
| 2014/0356564 | A1* | 12/2014 | Yamaguchi | H02G 3/0481 |
| | | | | 428/36.1 |
| 2015/0027778 | A1* | 1/2015 | Murao | B60R 16/0215 |
| | | | | 174/72 A |
| 2015/0056388 | A1* | 2/2015 | Yamaguchi | D06N 3/00 |
| | | | | 428/35.2 |
| 2015/0364233 | A1* | 12/2015 | Asami | H02G 15/1813 |
| | | | | 29/869 |
| 2016/0019998 | A1* | 1/2016 | Kawaguchi | H01B 13/01281 |
| | | | | 174/72 A |
| 2016/0260523 | A1* | 9/2016 | Aragiri | B60R 16/0215 |
| 2016/0280157 | A1* | 9/2016 | Katou | H02G 3/0462 |
| 2016/0366795 | A1* | 12/2016 | Ohkubo | B60R 16/0215 |
| 2017/0025201 | A1* | 1/2017 | Wakabayashi | H01B 7/0045 |
| 2017/0271052 | A1* | 9/2017 | Hara | H01B 17/26 |
| 2018/0223457 | A1* | 8/2018 | Kaing | D03D 15/0077 |
| 2019/0372321 | A1* | 12/2019 | Takamatsu | H01B 7/0045 |

FOREIGN PATENT DOCUMENTS

| | | |
|---|---|---|
| JP | 2013-201797 | 10/2013 |
| JP | 2007325357 | * 10/2013 |
| JP | 2013201797 A | * 10/2013 |
| JP | 2014-017985 | 1/2014 |

* cited by examiner

EXTERIOR MEMBER-EQUIPPED WIRE

TECHNICAL FIELD

The present invention relates to a technique for attaching an exterior member to a wire.

BACKGROUND ART

Patent Document 1 discloses a method for wrapping a protective sheet around a wire in which a pair of edge portions of the protective sheet that are located along the extension direction of the wire are each provided with a piece of double-sided adhesive tape, one of the edge portions is affixed to the wire side so as to serve as a wrapping-start portion, and the other is affixed to the outer face of the protective sheet that has already been wrapped around the wire so as to serve as a wrapping-end portion.

CITATION LIST

Patent Documents

Patent Document 1: JP 2014-17985

SUMMARY OF INVENTION

Technical Problem

However, with the technique described in Patent Document 1, a reaction force by which the protective sheet tries to return its the original state may lead to the protective sheet being deformed and the diameter increasing, making it impossible to maintain the state in which the protective sheet is wrapped with a small diameter. In addition, if the reaction force by which the protective sheet tries to return to its original state is greater than the adhesive force of the double-sided adhesive tape, the double-sided adhesive tape of the wrapping-end portion may be detached.

Therefore, it is an object of the present invention to provide a technique that makes it possible to easily maintain the wrapped state of a sheet member around a wire.

Solution to Problem

In order to solve the above-described problem, an exterior member-equipped wire according to a first aspect includes: a wire; and an exterior member formed by a sheet member wrapped around the wire, the sheet member including a sheet-like body portion formed to be able to be wrapped around the wire, and an easily bendable portion constituting a portion of the sheet-like body portion that extends along a circumferential direction of the wire and whose portion extending along an extension direction of the wire is formed to be more easy to bend than other portions of the sheet-like body portion.

An exterior member-equipped wire according to a second aspect is the exterior member-equipped wire according to the first aspect, wherein the easily bendable portion is a perforated line formed on the sheet-like body portion along the extension direction of the wire.

An exterior member-equipped wire according to a third aspect is the exterior member-equipped wire according to the first or second aspect, wherein the exterior member includes an overlapping portion formed by the sheet member being overlapped around the wire, and the easily bendable portion is formed on the sheet-like body portion located on an inner circumference side of the overlapping portion.

An exterior member-equipped wire according to a fourth aspect is the exterior member-equipped wire according to any one of the first to third aspects, further including a joining portion that fixes a wrapping-end portion coating an outer circumference of a portion of the sheet-like body portion that is wrapped around the wire, wherein the easily bendable portion is formed in at least a portion of a boundary region with the joining portion at the wrapping-end portion and a region in which the joining portion is provided at the wrapping-end portion.

An exterior member-equipped wire according to a fifth aspect is the exterior member-equipped wire according to any one of the first to fourth aspects, wherein the sheet-like body portion includes a first portion and a second portion that is softer than the first portion.

An exterior member-equipped wire according to a sixth aspect is the exterior member-equipped wire according to the fifth aspect, wherein at least one of the first portion and the second portion is distributed so as to be scattered in a surface of the sheet-like body portion.

An exterior member-equipped wire according to a seventh aspect is the exterior member-equipped wire according to the sixth aspect, wherein the first portion is formed to be more thermally compressed in a thickness direction than the second portion, and the sheet-like body portion is formed such that a portion thereof on which the first portion is formed is recessed.

An exterior member-equipped wire according to an eighth aspect is the exterior member-equipped wire according to any one of the first to seventh aspects, wherein the exterior member is formed by the sheet member being wrapped around the wire for two or more turns.

Advantageous Effects of Invention

The first to eighth aspects include the easily bendable portion constituting a portion of the sheet-like body portion that extends along the circumferential direction of the wire and whose portion extending along the extension direction of the wire is formed to be more easy to bend than the other portions of the sheet-like body portion. Accordingly, the reaction force that acts when the sheet-like body portion is wrapped around the wire is reduced. This makes it possible to easily maintain the wrapped state of the sheet member around the wire.

In particular, according to the second aspect, the easily bendable portion is a perforated line formed on the sheet-like body portion along the extension direction of the wire, and thus the easily bendable portion can be formed with a simple configuration.

When the sheet member is wrapped around the wire such that the sheet member is overlapped, of the wrapping radii of the sheet member, due to the wrapping radius on the inner circumference side of the overlapped portion being smaller than the wrapping radius on the outer circumference side of the overlapped portion, the reaction force acting on the sheet member on the inner circumference side of the overlapped portion is increased. In this case as well, according to the third aspect, it is possible to reduce the reaction force acting on the sheet member on the inner circumference side of the overlapped portion since the easily bendable portion is formed on the sheet-like body portion located on the inner circumference side of the overlapping portion. Accordingly, the sheet member on the inner circumference side of the overlapped portion can be easily maintained having a small diameter, making it easier to maintain the wrapped state of the sheet member around the wire.

When the reaction force acting on the exterior member in the vicinity of the joining portion is large, there is the possibility that the joined state of the joining portion will be released. In this case as well, according to the fourth aspect, it is possible to reduce the reaction force acting on the exterior member in the vicinity of the joining portion since the easily bendable portion is formed in at least a portion of the boundary region with the joining portion at the wrapping-end portion and the region in which the joining portion is provided. Accordingly, the joined state of the joining portion is less likely to be released, and the wrapped state of the sheet member around the wire can be easily maintained.

In particular, according to the fifth aspect, the wrapped state can be more easily maintained than when the entire sheet-like body portion is formed only with the first portion. In addition, the first portion and the second portion can have different functions.

In particular, according to the sixth aspect, when cutting a sheet having a large size to the desired dimensions to obtain a plurality of sheet-like body portions, there will be less variations among the sheet-like body portions, making it possible to obtain sheet-like body portions of a relatively uniform quality.

In particular, according to the seventh aspect, the first portion and the second portion can be formed, for example, through embossing. This makes it possible to further easily produce the sheet-like body portion.

In particular, according to the eighth aspect, it is possible to enhance the protection properties provided by the exterior member.

DESCRIPTION OF EMBODIMENTS

Embodiments

Figure 1:
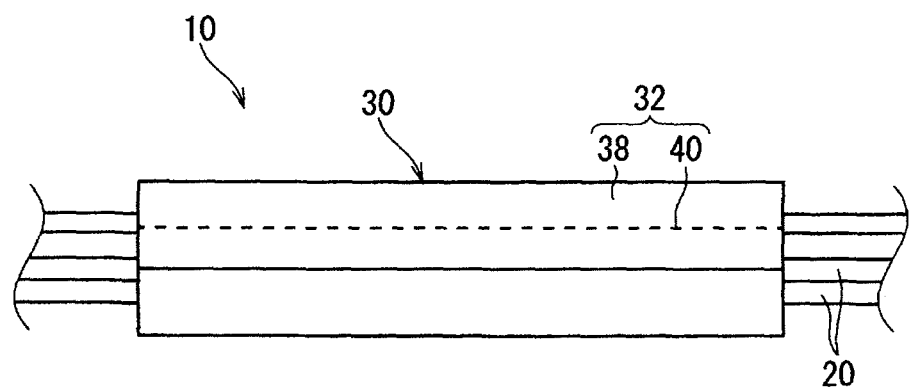
FIG. 1 is a plan view showing an exterior member-equipped wire according to an embodiment.
Figure 2:
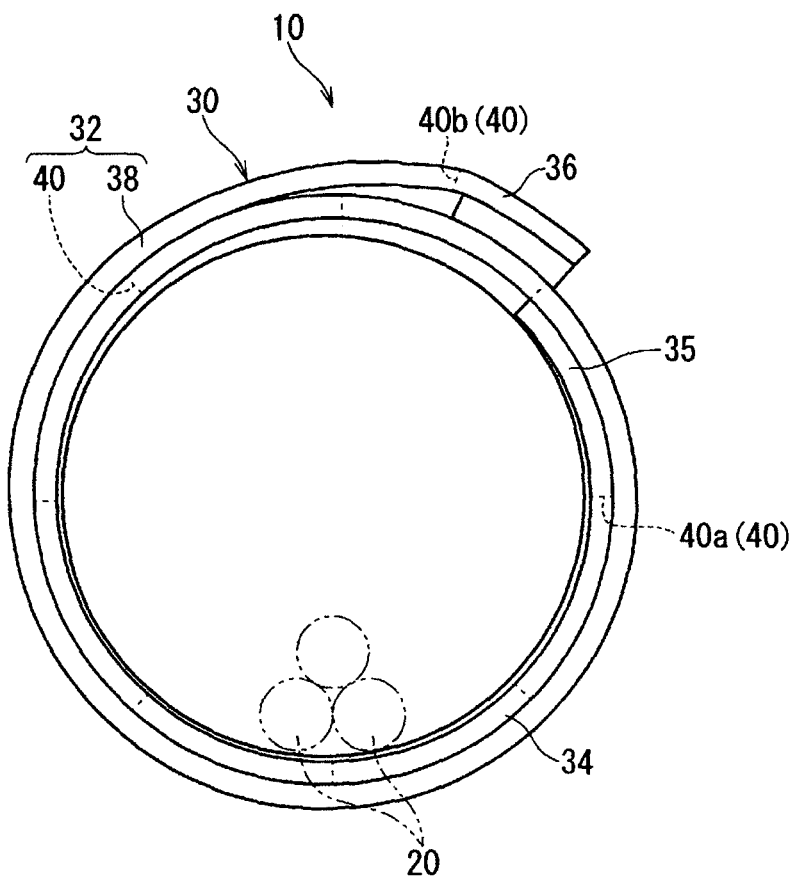
FIG. 2 is a side view showing the exterior member-equipped wire according to an embodiment.
Figure 3:
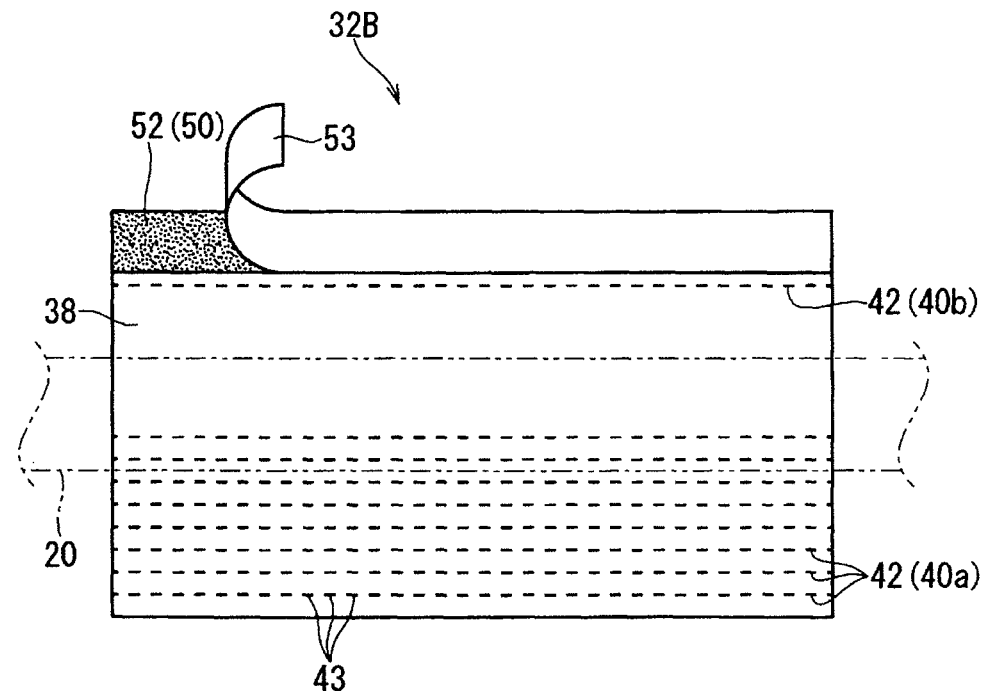
FIG. 3 is a plan view showing a sheet member according to an embodiment.

Hereinafter, an exterior member-equipped wire according to an embodiment will be described. FIG. 1 is a plan view showing an exterior member-equipped wire 10 according to an embodiment. FIG. 2 is a side view showing the exterior member-equipped wire 10 according to an embodiment. FIG. 3 is a plan view showing a sheet member 32 according to an embodiment.

The exterior member-equipped wire 10 according to the embodiment includes a wire 20 and an exterior member 30.

Here, the exterior member-equipped wire 10 further includes a joining portion 50.

At least one wire 20 may be included. In the present embodiment, a case will be described where the exterior member-equipped wire 10 includes a bundle of wires 20 that includes a plurality of wires 20. Each wire 20 includes, for example, a core wire and a coating formed around the core wire. The core wire is formed in a linear shape and is made of a conductive material such as copper, a copper alloy, aluminum, or an aluminum alloy. Here, the core wire is configured by a plurality of element wires that are twisted together. However, the core wire may be configured by a single wire. The coating is made by extruding an insulating resin material around the core wire using an extruder or the like. A connector or the like is connected to an end portion of the wire 20. The wire 20 is connected, in a state of being arranged at a target arrangement position in a vehicle or the like, to various electric devices mounted on the vehicle or the like via a connector or the like. Then, the wire 20 is used to electrically connect the various electric devices to each other.

The exterior member 30 is formed by wrapping the sheet member 32 around the wire 20. The exterior member 30 includes an overlapping portion 34 formed by overlapping the sheet member 32 around the wire 20. Here, the sheet member 32 is wrapped around the wire 20 for two turns. Therefore, here, the overlapping portion 34 is provided around the entire circumference of the wire 20. However, the overlapping portion 34 may not be provided. Even if an overlapping portion is provided, the overlapping portion may be partially provided around the wire 20. Wrapping the sheet member 32 around the wire 20 for more than one turn and less than two turns partially provides an overlapping portion. In the following, a pre-wrapped sheet member 32 may be referred to as a sheet member 32B.

The sheet member 32B includes a sheet-like body portion 38 and an easily bendable portion 40.

The sheet-like body portion 38 is formed so as to be able to be wrapped around the wire 20. Here, the sheet-like body portion 38 is assumed to be subjected to a reaction force acting in a direction in which the wrapped state would be released, in a state in which the sheet-like body portion 38 is wrapped around the wire 20. A possible example of such a sheet-like body portion 38 is a sheet-like body portion that is uniformly formed, for example, using a resin such as VC (polyvinyl chloride) or PP (polypropylene) as the material. It is also possible to use a non-woven fabric as the sheet-like body portion 38. The non-woven fabric may be either a so-called filament non-woven fabric or staple non-woven fabric. A possible example of the filament non-woven fabric is a spunbonded non-woven fabric or the like. Here, the sheet-like body portion 38 is formed so as to be able to be wrapped around the wire 20 for two turns. However, the wrapping amount of the sheet-like body portion 38 may be smaller or larger than two turns around the wire 20. Preferably, the wrapping amount of the sheet-like body portion 38 may be two or more turns. By setting the wrapping amount to two or more turns, it is possible to reduce the thickness of the sheet member 32 while ensuring the required protection properties, and to provide the effect of suppressing the reaction force during wrapping, compared to when the required protection properties is to be satisfied by a single turn. On the other hand, the wrapping amount affects the workability when attaching the sheet member 32 to the wire 20. Therefore, the wrapping amount is preferably four turns or less, provided that the required protection properties are satisfied.

The easily bendable portion 40 is formed such that a portion constituting a portion of the sheet-like body portion 38 that extends along the circumferential direction of the wire 20 and whose portion extending along the extension direction of the wire 20 is more easy to bend than other portions of the sheet-like body portion 38.

Here, the easily bendable portion 40 is a perforated line 42 formed on the sheet-like body portion 38, extending along the extension direction of the wire 20. The perforated line 42 is an assembly of a plurality of recesses 43 that have a small size and extend along the extension direction and are formed at intervals in the extension direction. That is, small recesses 43 are discontinuously formed in the extension direction to form the perforated line 42. Note that each recess 43 may be a hole with a width dimension (a dimension along a direction orthogonal to the extension direction), or may be a slit with no width dimension. When the recess 43 is a hole, the shape of the hole is not particularly limited. However, the hole is preferably a long hole that is formed in a rectangular shape or an oblong shape and is long in the extension direction. Note that the perforated line 42 may be inclined to a certain degree relative to the extension direction of the wire 20.

A portion of the sheet-like body portion 38 on which the perforated line 42 is formed has reduced rigidity. Accordingly, the reaction force that acts when the sheet-like body portion 38 is wrapped is reduced. As a result, the wrapped state can be easily maintained. In particular, the portion of the sheet-like body portion 38 on which the perforated line 42 is formed can be bent into a curved shape. When the portion of the sheet-like body portion 38 on which the perforated line 42 is formed is bent into a curved shape, portions of the sheet-like body portion 38 other than the portion on which the perforated line 42 is formed require only a small curvature radius, and the reaction force acting thereon is reduced. Furthermore, by being bent into a curved shape, the portion on which the perforated line 42 is formed is shaped into a curved shape or a shape similar thereto, depending on the material constituting the sheet-like body portion 38. It appears that this also reduces the reaction force.

Here, the easily bendable portion 40 is formed on the sheet-like body portion 38 located on the inner circumference side of the overlapping portion 34. Also, the easily bendable portion 40 is formed in a boundary region with the joining portion 50 at the wrapping-end portion 36. In the following, the easily bendable portion 40 formed on the sheet-like body portion 38 located on the inner circumference side of the overlapping portion 34 may be referred to as an easily bendable portion 40*a*, and the easily bendable portion 40 formed in the boundary region with the joining portion 50 at the wrapping-end portion 36 may be referred to as an easily bendable portion 40*b*.

Here, the easily bendable portion 40*a* is formed at the portion of the sheet member 32 that corresponds to one turn when wrapped around the wire 20, on the inner circumference side. Accordingly, the reaction force acting on the portion wrapped on the inner circumference side, where the diameter is smaller, is reduced as compared with the reaction force that acts on the portion wrapped on the outer circumference side, and thus the force acting to increase the diameter is reduced. As a result, the portion located on the inner circumference side can be maintained at a smaller diameter. Although eight perforated lines 42 are formed at equal intervals in the circumferential direction in the example shown in FIG. 3, the number and the position of the perforated lines 42 are not limited thereto.

Here, the easily bendable portion 40*b* is formed in a boundary region with the joining portion 50 at the wrapping-end portion 36. Accordingly, the reaction force acting on the boundary region of the sheet-like body portion 38 with the joining portion 50 is reduced, and the force acting to release the joined state of the joining portion 50 is reduced. As a result, the joining portion 50 is less likely to come apart, and the wrapped state of the exterior member 30 can be easily maintained.

More specifically, as a result of the easily bendable portion 40*b* being formed in the boundary region, of the force (reaction force) under which the sheet-like body portion 38 spreads out, at least a portion of the force acting on the wrapping-end edge portion side relative to the easily bendable portion 40*b* is allowed to escape and weakened due to the formation of the easily bendable portion 40*b*. On the other hand, the reaction force acting on the wrapping-start portion 35 side relative to the easily bendable portion 40*b* still remains. Here, the reaction force is mainly a force acting along the direction of the normal line of the sheet-like body portion 38. The normal line direction of the sheet-like body portion 38 located slightly toward the wrapping-start portion 35 relative to the portion at which the easily bendable portion 40*b* is formed is a direction more inclined than the normal line direction relative to the joining portion 50, and hence is a direction close to the shear direction relative to the joining portion 50. Accordingly, the reaction force acting on the exterior member 30 on the wrapping-start portion 35 side relative to the easily bendable portion 40*b* is less likely to act as a force to release the joined state of the joining portion 50. Due to the foregoing, as a result of the easily bendable portion 40*b* being formed in the boundary region with the joining portion 50 at the wrapping-end portion 36, the joined state of the joining portion 50 is less likely to be released, and the wrapped state of the exterior member 30 can be easily maintained.

In the example shown in FIG. 3, as the easily bendable portion 40*b*, a single perforated line 42 is formed slightly more on the wrapping-start portion 35 side relative to the boundary between the end portion on the wrapping-start portion 35 side and the wrapping-end portion 36 of the joining portion 50. However, the number and the position of the perforated line 42 are not limited thereto.

The perforated line 42 formed as the easily bendable portion 40*a* and the perforated line 42 formed as the easily bendable portion 40*b* may be formed in the same shape, or may be formed in different shapes.

The joining portion 50 is a portion that fixes the wrapping-end portion 36 covering the outer circumference of a portion of the sheet-like body portion 38 that is wrapped around the wire 20. Here, a description is given for an example in which the joining portion 50 is a piece of double-sided adhesive tape 52 attached along the outer edge of the wrapping-end portion 36. However, the joining portion 50 may be formed, for example, using an adhesive or through welding or the like. When the joining portion 50 is a piece of double-sided adhesive tape 52, it is conceivable that a peelable sheet 53 is provided on the surface of the adhesion layer on the pre-wrapped sheet member 32B, as shown in FIG. 3.

Such an exterior member-equipped wire 10 includes the easily bendable portion 40 constituting a portion of the sheet-like body portion 38 that extends along the circumferential direction of the wire 20 and whose portion extending along the extension direction of the wire 20 is formed to be more easy to bend than the other portions of the sheet-like body portion 38. Accordingly, the reaction force that acts when the sheet-like body portion 32 is wrapped around the wire 20 is reduced. This makes it possible to easily maintain the wrapped state of the sheet member 32 around the wire 20.

Since the easily bendable portion 40 is formed by a perforated line 42 being formed on the sheet-like body portion 38 along the extension direction of the wire 20, the easily bendable portion 40 can be formed with a simple configuration.

When the sheet member 32B is wrapped around the wire 20 such that the sheet member 32 is overlapped, of the wrapping radii of the sheet member 32, the wrapping radius on the inner circumference side of the overlapped portion is smaller than the wrapping radius on the outer circumference side of the overlapped portion, thus increasing the reaction force acting on the sheet member 32 on the inner circumference side of the overlapped portion. In this case as well, with the exterior member-equipped wire 10, it is possible to reduce the reaction force acting on the sheet member 32 on the inner circumference side of the overlapped portion since the easily bendable portion 40 is formed on the sheet-like body portion 38 located on the inner circumference side of the overlapping portion 34. Accordingly, the sheet member 32 on the inner circumference side of the overlapped portion can be easily maintained having a small diameter, making it easy to maintain the wrapped state of the sheet member 32 around the wire 20.

Since the sheet member 32 on the inner circumference side of the overlapped portion can be easily maintained having a small diameter, it is not necessary to increase the size of the sheet member 32 in advance in view of the fact that the overlapped portion may spread out when the sheet member 32 is wrapped for two turns. Accordingly, the size of the sheet member 32 can be reduced. If the overlapped portion spreads out, there is the possibility that variations in products will occur due to differences in the degree of spreading. If the overlapped portion further spreads out, there is the possibility that a gap will form between the wire 20 and the exterior member 30, and an unusual noise may occur. In this respect, with the exterior member-equipped wire 10, the above-described possibilities can be suppressed by making it possible to easily maintain the sheet member 32 on the inner circumference side of the overlapped portion at a small diameter.

When the reaction force acting on the exterior member 30 in the vicinity of the joining portion 50 is large, there is the possibility that the joined state of the joining portion 50 will be released. In this case as well, with the exterior member-equipped wire 10, it is possible to reduce the reaction force acting on the exterior member 30 in the vicinity of the joining portion 50 since the easily bendable portion 40 is formed in the boundary region with the joining portion 50 at the wrapping-end portion 36. Accordingly, the joined state of the joining portion 50 is less likely to be released, and the wrapped state of the sheet member 32 around the wire 20 can be easily maintained.

Modifications

Figure 4:
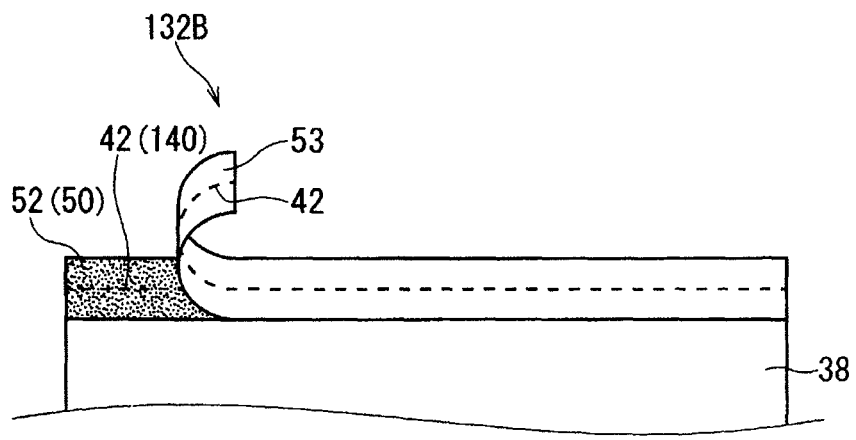
FIG. 4 is a plan view showing a modification of the exterior member.
Figure 5:
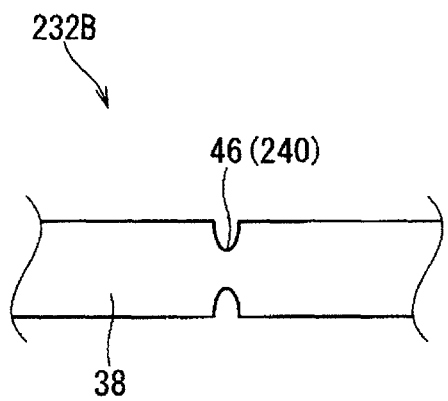
FIG. 5 is a plan view showing another modification of the exterior member.

Next, modifications of the sheet member 32B will be described. FIG. 4 is a plan view showing a modification of the sheet member 32B. FIG. 5 is a plan view showing another modification of the sheet member 32B.

In the embodiment, the easily bendable portion 40 is described as being formed in a boundary region with the joining portion 50 at the wrapping-end portion 36. However, this is not essential. As in a sheet member 132B according to the modification shown in FIG. 4, an easily bendable portion 140 may be formed in a region in which the joining portion 50 is provided at the wrapping-end portion 36. In this case, the easily bendable portion 40b may be formed together therewith. Accordingly, an easily bendable portion may be formed in at least a portion of a boundary region with the joining portion 50 at the wrapping-end portion 36 and a region in which the joining portion 50 is provided at the wrapping-end portion 36. The easily bendable portion 140 is a perforated line 42 as with the easily bendable portion 40. In this case, the perforated line 42 may be formed in a state in which the sheet-like body portion 38 is provided with a double-sided adhesive tape 52 and a peelable sheet 53. In this case, the perforated line 42 is also formed on the double-sided adhesive tape 52 and the peelable sheet 53.

In the embodiment, the easily bendable portion 40 is described as being a perforated line 42. However, this is not essential. As in a sheet member 232B according to a modification shown in FIG. 5, an easily bendable portion 240 may be a pressed portion 46 formed by pressing a portion of the sheet-like body portion 38. The pressed portion 46 is compressed to have a reduced thickness. In this case, it is conceivable that the perforated line 42 and the pressed portion 46 are formed together as the easily bendable portion 240 at the same position. It is also conceivable that a portion of the easily bendable portion that is located on the inner circumference side of the overlapping portion 34 is a perforated line 42, and a portion thereof located in the boundary region with the joining portion 50 is the pressed portion 46. In the example shown in FIG. 5, both of the main surfaces of the sheet-like body portion 38 are pressed so as to be recessed. However, only one surface may be pressed so as to be recessed. When the easily bendable portion 240 is the pressed portion 46, a reduction in waterproofing or the like can be suppressed compared to when the easily bendable portion 40 is the perforated line 42.

Figure 6:
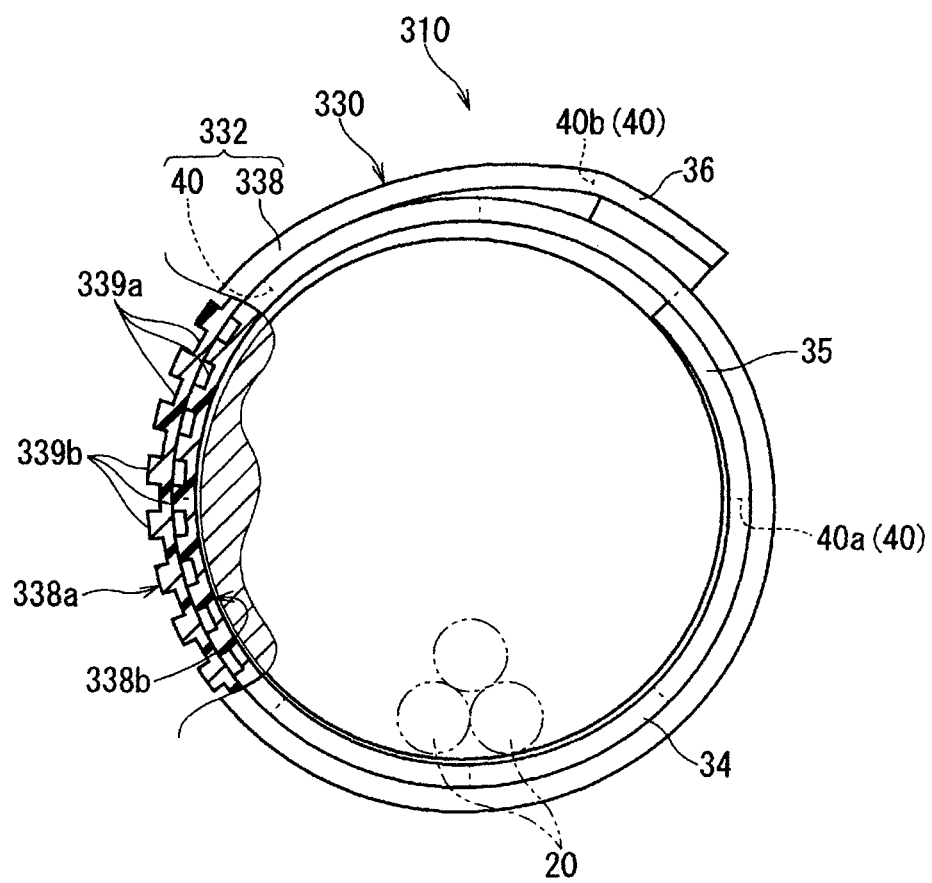
FIG. 6 is a partially cut-out side view showing a modification of the exterior member-equipped wire.
Figure 7:
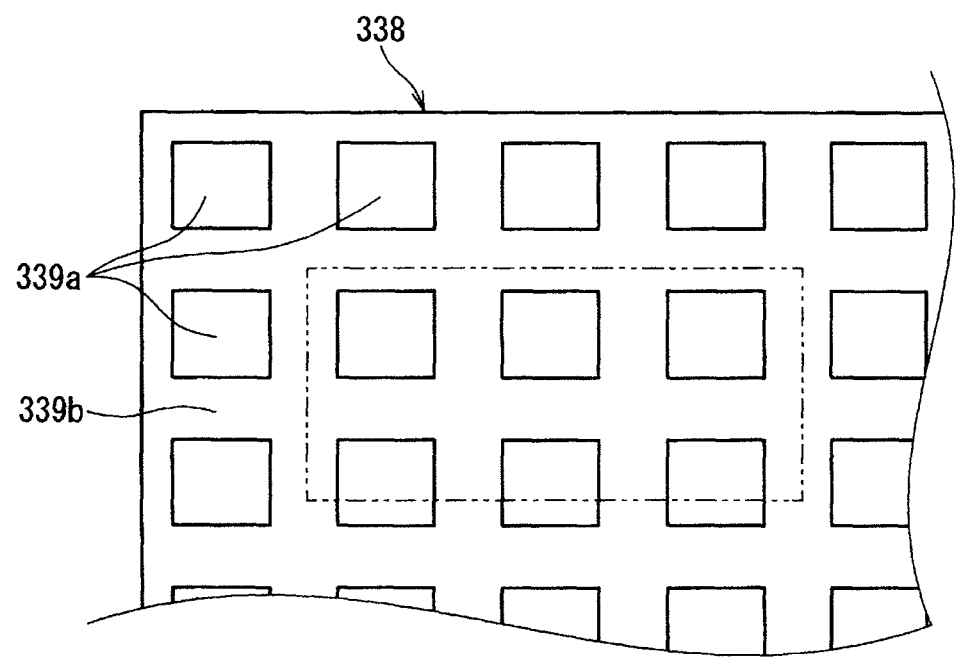
FIG. 7 is a plan view showing a sheet member of an exterior member-equipped wire according to a modification.
Figure 8:
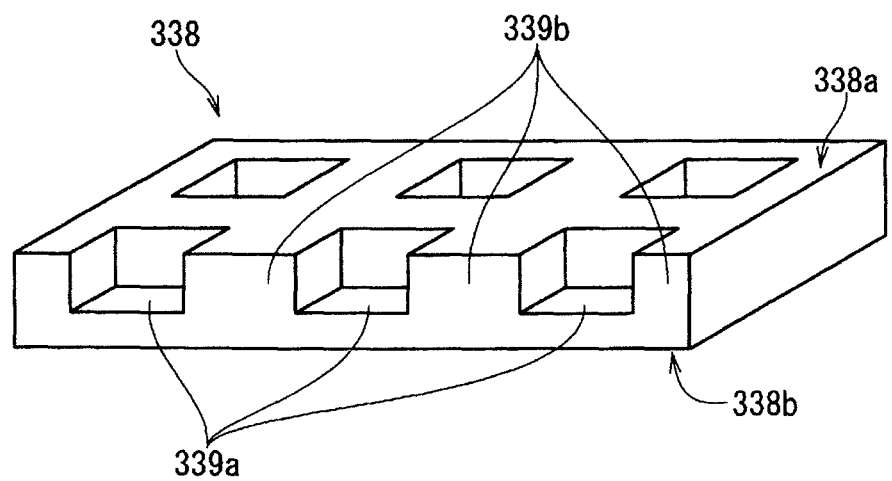
FIG. 8 is a perspective view showing a sheet member of an exterior member-equipped wire according to a modification.

Next, a modification of the exterior member-equipped wire will be described with reference to FIGS. 6 to 8. FIG. 6 is a partially cut-out side view showing a modification of the exterior member-equipped wire 10 according to the embodiment. FIG. 7 is a plan view showing a sheet-like body portion 338 of an exterior member-equipped wire 310 according to the modification. FIG. 8 is a perspective view showing the sheet-like body portion 338 of the exterior member-equipped wire 310 according to the modification. Note that FIG. 8 shows the region indicated by the virtual lines (dashed double-scattered lines) in FIG. 7 as being cut out.

The shape of a sheet member 332 constituting an exterior member 330 of the exterior member-equipped wire 310 according to the modification is different from the shape of the sheet member 32 constituting the exterior member 30 of the exterior member-equipped wire 10 according to the embodiment.

Specifically, the sheet-like body portion 338 constituting the sheet member 332 includes a first portion 339a and a second portion 339b that is softer than the first portion 339a. Also, the sheet member 332 is formed by separately forming an easily bendable portion 40 on the sheet-like member 338.

The first portion 339a and the second portion 339b have different functions. Here, providing the first portion 339a enhances the protection properties of the exterior member 330, whereas providing the second portion 339b enhances the soundproofing properties of the exterior member 330.

Here, at least one (here, the first portion 339a) of the first portion 339a and the second portion 339b is distributed so as to be scattered in a surface of the sheet-like body portion 338. Here, the first portion 339a is formed in a rectangular shape that is shorter in the longitudinal direction and the width direction than the sheet-like body portion 338. Then, as shown in FIG. 7, many first portions 339a are distributed so as to be scattered in a surface of the sheet-like body portion 338, and portions where the first portion 339a is not formed in the surface of the sheet-like body portion 338 constitute the second portion 339b.

Here, the first portions 339a are uniformly scattered over the entire surface of the sheet-like body portion 338. In particular, here, the first portions 339a are formed aligned along the longitudinal direction and the width direction of the sheet-like body portion 338. Accordingly, the second portion 339b has a grid configuration. At this time, since the first portions 339a each have a square shape, the sheet-like body portion 338 has no directionality in the longitudinal direction and the width direction.

In a direction connecting a wrapping-start direction and a wrapping-end direction, the interval between the adjacent first portions 339a, i.e., a dimension of the second portion 339b located between adjacent first portions 339a may be set to be the same dimension as the first portion 339a in that direction, or the dimension of either one of them may be set to be larger.

The first portion 339a is formed so as to be recessed in the thickness direction of the sheet-like body portion 338 relative to the second portion 339b. Here, the first portion 339a is formed such that one main surface 338a side of the sheet-like body portion 338 is recessed toward the other main surface 338b side. Accordingly, the one main surface 338a of the sheet-like body portion 338 has a shape in which projections and recesses appear on the surface, and the other main surface 338b of the sheet-like body portion 338 has a planar shape in which no projections or recesses appear on the surface thereof. At this time, the first portion 339a is formed so as to be harder than the second portion 339b since the degree of compression of the non-woven fabric thereof is greater than that of the member second portion 339b, more specifically, because one of portions having the same level of thickness is compressed to a greater degree.

Examples of objects coming into direct contact with the sheet-like body portion 338 include objects located inside the sheet-like body portion 338 such as a wire, and also objects located outside the sheet-like body portion 338, including, for example, components constituting a vehicle body such as a body for an automobile application. However, in terms of protection properties, it is not preferable that an object, which is to be protected, locally comes into contact only with the region of the second portion 339b. Although depending on the application, if a wire is the object that is to be protected and is most likely to come into localised contact, it is conceivable that the size of the first portion 339a and the width of the second portion 339b are the same or shorter than the diameter of a wire 12, for example. For example, it is conceivable that the rectangular recess of the first portion 339a is formed to be 1 millimeter long (dimension around a wire bundle 12a), about 1 millimeter wide (dimension along the extension direction of the wire bundle 12b), and the width of the second portion 339b is formed to be about 1 millimeter. However, the size and the number of the first portions 339a, a width of the second portion 339b, and the like are values that can be appropriately set depending on the compression amount, the heating temperature, and the like, as well as the shape and the like of the object to be protected, according to the required level of soundproofing properties and protection properties.

Here, the sheet-like body portion 338 is wrapped around the wire 12 with the other main surface 338b on which no projections or recesses appear on the surface facing toward the wire 12. Therefore, the one main surface 338a on which projections and recesses appear on the surface constitutes the outer face of the exterior member 330. Accordingly, when the exterior member-equipped wire 310 and a member external to the exterior member-equipped wire 310 come into contact, the external member is likely to come into contact with the second portion 339b, and an unusual noise is less likely to occur. Therefore, it is possible to enhance the soundproofing properties when the cause of an unusual noise exists outside the exterior member-equipped wire 310.

Here, in the sheet-like body portion 338 wrapped around the wire 12 for two turns, the first portions 339a on the sheet-like body portion 338 on the outer circumference side and the first portions 339a on the sheet-like body portion 338 on the inner circumference side are disposed so as to be displaced in the circumferential direction. However, the first portions 339a on the sheet-like body portion 338 on the outer circumference side and the first portions 339a on the sheet-like body portion 338 on the inner circumference side may be disposed at the same positions in the circumferential direction.

Such a sheet-like body portion 338 can be produced, for example, by embossing a non-woven material. More specifically, for example, a non-woven material (called a "web") formed through spin bonding or the like and including stacked layers of fibers is continuously sent out to a pair of heating rollers. At this time, a projection-recess configuration that is inverse to the projection-recess configuration formed on the sheet-like body portion 338 is formed on the surface of one of the pair of heating rollers. Then, when the web is fed out while being sandwiched between the pair of heating rollers, a portion of the web is more compressed by the projection shape portions formed on one of the heating rollers than another portion, and the projection-recess configuration of the heating roller is successively transferred to the web in an inversed manner. As a result of the webs as a whole being heated in this state by the pair of heating rollers, the webs are coupled together while maintaining the compressed state. Thus, a non-woven member on which the projection-recess configuration corresponding to the projection-recess configuration of the heating roller is formed is continuously produced. By cutting the non-woven member on which the projection-recess configuration is formed to an appropriate size, a sheet-like body portion 338 is completed.

At this time, a sheet member 332 can be formed by forming an easily bendable portion 40, for example, by forming the perforated line 42 on the sheet-like body portion 338 before or after cutting. When a plurality of perforated lines 42 are provided in parallel as in the case of the perforated lines 42 according to the easily bendable portion 40a, the pitch between adjacent perforated lines 42 and the pitch between adjacent first portions 339a may be either the same or different. When the pitch between adjacent perforated lines 42 and the pitch between adjacent first portions 339a are different, the pitch between adjacent perforated lines 42 may be either larger or smaller than the pitch between adjacent first portions 339a. For example, when the pitch between adjacent perforated lines 42 is greater than or equal to two times the pitch between adjacent first portions 339a, a plurality of first portions 339a are present between the adjacent perforated lines 42.

When a pressed portion 46 as shown in FIG. 5 is formed as the easily bendable portion, it is conceivable that the width dimension of the pressed portion 46 is sufficiently smaller than the width dimension of the first portion 339a.

The position at which a perforated line 42 is provided may be a position that overlaps the first portion 339a, or may be a position that does not overlap the first portion 339a, i.e., a position that overlaps only the second portion 339b.

By wrapping such a sheet member 332 around the wire 12 at a desired position along the longitudinal direction in a state in which the other main surface 338b having a planar shape faces the wire 12, an exterior member-equipped wire 310 is completed.

Although the first portion 339a is described as being formed in a rectangular shape, this is not essential. The first portion may be formed, for example, in any other angular shape such as a triangular shape or a pentagonal shape, or a circular shape or the like. The first portion may also be formed in the shape of, for example, a groove extending in one direction in a surface on the one main surface side of the protection member.

Although the recess formed during formation of the first portion 339a has a rectangular solid shape, this is not essential. For example, the first portion may be formed in a frustum shape, i.e., a shape that gradually widens toward the one main surface 338a along the thickness direction.

Although only the one main surface 338a of the sheet-like body portion 338 side is described as having a projection-recess configuration, this is not essential. Both of the main surfaces 338a and 338b of the sheet-like body portion 338 may have a projection-recess configuration. For example, a recessed portion recessed in a rectangular shape may be formed on both of the main surfaces 338a and 338b. In this case, the recessed portion on the other main surface 338b side may be formed at the same position in a surface as the recessed portion on the one main surface 338a side. Alternatively, the recessed portion on the other main surface 338b side may be formed at a position in a surface that is displaced from the recessed portion on the one main surface 338a side, for example, on the backside of a portion corresponding to a grid point of a grid-shaped second portion on the one main surface 338a side. For example, the first portion may be formed such that a plurality of first grooves formed so as to extend in a first direction in a surface on the one main surface 338a side of the protection member are provided so as to be arranged along a second direction in the surface, and a plurality of second grooves formed so as to extend in the second direction on the other main surface 338b of the protection member are arranged along the first direction. In this case, a portion of the first portion at which a first groove and a second groove intersect is formed to be harder than a portion at which only a first groove or a second groove is formed.

The first portion 339a is described as being scattered and the second portion 339b is described as being formed having a grid configuration on the sheet-like body portion 338. However, the arrangement of the first portion 339a and the second portion 339b is not limited thereto. For example, the first portion and the second portion may be formed in an arrangement inverse to that of the sheet-like body portion 338. That is, the first portion may be formed in a grid configuration, and the second portion may be scattered. Alternatively, for example, the first portion and the second portion may be formed having the same rectangular shape, and the first portion and the second portion may be formed in such an arrangement that the four sides of a first portion are surrounded by second portions, and the four sides of a second portion are surrounded by first portions, i.e., an arrangement in which the first portions and the second portions are completely scattered without the first portions being adjacent to each other and the second portions being adjacent to each other.

With such an exterior member-equipped wire 310, the wrapped state can be more easily maintained than when the entire sheet-like body portion is formed only with first portion 339a. In addition, the first portion 339a and the second portion 339 can have different functions.

When cutting a sheet having a large size to the desired dimensions to obtain a plurality of sheet-like body portions 338, there will be less variations among the sheet-like body portions 338, making it possible to obtain sheet-like body portions 338 of a relatively uniform quality. Since the sheet-like body portion 338 has no directionality in the width direction and the longitudinal direction, it is easy to cut a sheet with a large size to the size of the desired sheet-like body portion 338 and use the sheet.

The first portion 339a and the second portion 339b can be formed, for example, through embossing. This makes it possible to produce the sheet-like body portion 338 even more easily.

Although the perforated line 42 is described as being partly formed along the width direction of the sheet-like body portion 38 in the embodiment, this is not essential. For example, a plurality of perforated lines 42 may be uniformly formed at equal intervals along the entire width direction of the sheet-like body portion 38.

Note that the configurations described in the embodiments and the modifications may be combined as appropriate as long as there are no mutual inconsistencies.

Although the present invention has been described above in detail, the foregoing description is in all aspects illustrative and the invention is not limited thereto. It will be appreciated that numerous modifications not illustrated herein can be made without departing from the scope of the present invention.

LIST OF REFERENCE NUMERALS

10 Exterior member-equipped wire
20 Wire
30 Exterior member
32 Sheet member
32B Pre-wrapped sheet member
34 Overlapping portion
36 Sheet-like body portion
40 Easily bendable portion
42 Perforated line
43 Recess
46 Pressed portion
50 Joining portion

What is claimed is:

1. An exterior member-equipped wire comprising:
a wire; and
an exterior member formed by a sheet member wrapped around the wire, the sheet member including a sheet body portion configured to be wrapped around the wire, and a bendable portion constituting a portion of the sheet body portion that extends along a circumferential direction of the wire and has a portion extending along an extension direction of the wire that is configured to bend more easily than other portions of the sheet body portion, wherein
the bendable portion includes a plurality of recesses or holes of the sheet body portion that are spaced apart from one another in the circumferential direction, and a continuous portion of the sheet body portion that is one of the other portions of the sheet body portion and that extends in the circumferential direction covers the plurality of recesses or holes.

2. The exterior member-equipped wire according to claim 1, wherein
the bendable portion includes a perforated line formed on the sheet body portion along the extension direction of the wire.

3. The exterior member-equipped wire according to claim 1, wherein
the exterior member includes an overlapping portion formed by the sheet member being overlapped around the wire, and
the bendable portion is formed on the sheet body portion located on an inner circumference side of the overlapping portion.

4. The exterior member-equipped wire according to claim 1, further comprising:
a joining portion that fixes a wrapping-end portion coating an outer circumference of a portion of the sheet body portion that is wrapped around the wire, wherein
the bendable portion is formed in at least a portion of a boundary region with the joining portion at the wrapping-end portion and a region in which the joining portion is provided at the wrapping-end portion.

5. The exterior member-equipped wire according to claim 1, wherein
the sheet body portion includes a first portion and a second portion that is softer than the first portion.

6. The exterior member-equipped wire according to claim 5, wherein
at least one of the first portion and the second portion is distributed so as to be scattered on a surface of the sheet body portion.

7. The exterior member-equipped wire according to claim 6, wherein
the first portion is more thermally compressed in a thickness direction than the second portion, and the sheet body portion is formed such that a portion thereof on which the first portion is formed is recessed.

8. The exterior member-equipped wire according to claim 1, wherein
the exterior member is formed by the sheet member being wrapped around the wire for two or more turns.

9. An exterior member-equipped wire comprising:
a wire; and
an exterior member formed by a sheet member wrapped around the wire, the sheet member including a sheet body portion configured to be wrapped around the wire, and a bendable portion constituting a portion of the sheet body portion that extends along a circumferential direction of the wire and has a portion extending along an extension direction of the wire that is configured to bend more easily than other portions of the sheet body portion, wherein
the sheet body portion includes a first portion and a second portion that is softer than the first portion, and
at least one of the first portion and the second portion is distributed so as to be scattered on a surface of the sheet body portion.

* * * * *